March 6, 1962   A. W. HAYDON   3,023,567
TIMING MECHANISM

Filed Aug. 18, 1960   2 Sheets-Sheet 1

INVENTOR
Arthur W. Haydon
BY
ATTORNEYS

March 6, 1962   A. W. HAYDON   3,023,567
TIMING MECHANISM
Filed Aug. 18, 1960   2 Sheets-Sheet 2
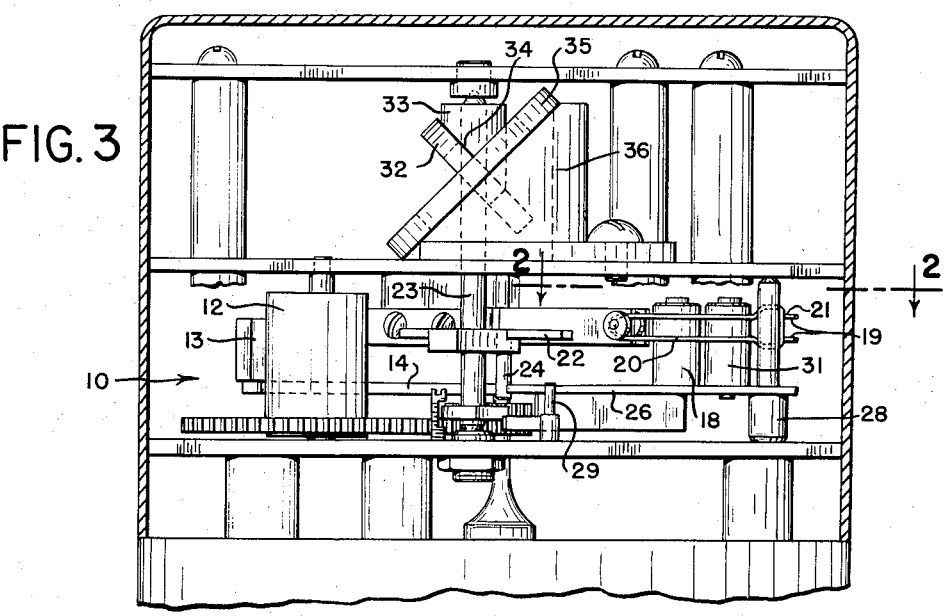
FIG. 3
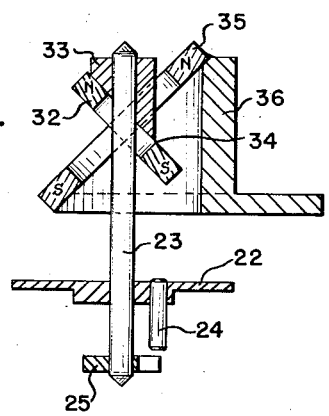
FIG. 4
FIG. 5
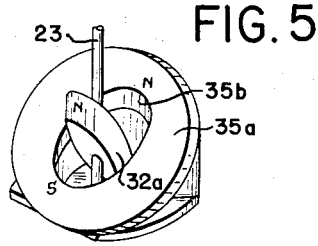
FIG. 6
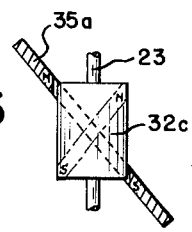
FIG. 7
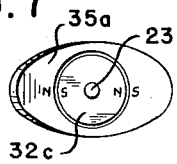
FIG. 8
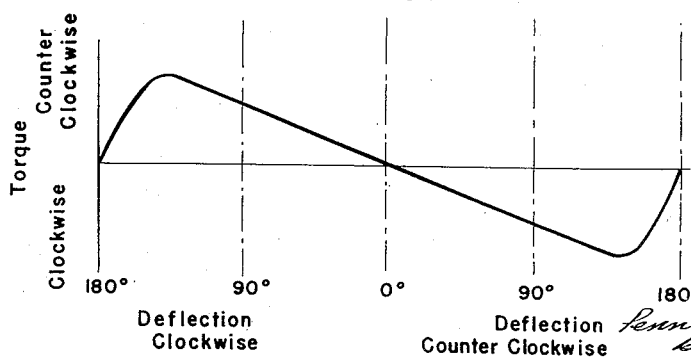
INVENTOR
Arthur W. Haydon
BY
ATTORNEYS

United States Patent Office 3,023,567
Patented Mar. 6, 1962

---

3,023,567
TIMING MECHANISM
Arthur W. Haydon, Milford, Conn., assignor to Consolidated Electronics Industries Corp., Waterbury, Conn., a corporation of Delaware
Filed Aug. 18, 1960, Ser. No. 50,445
9 Claims. (Cl. 58—117)

The present invention relates to timing mechanisms, and more particularly to a novel and improved timing device incorporating an oscillating constant speed system, in the nature of a balance wheel system, utilizing in the place of the usual hairspring a novel and advantageous form of magnetic means.

In a typical timing mechanism, such as a clock, chronometric governor, or the like, it is conventional to employ an oscillating constant speed system, usually in the form of a balance wheel and hairspring. The rotating inertia of the balance wheel and the characteristics of the spring are so related as to provide a theoretically constant period of oscillation, the oscillating motion being rendered continuous by the periodic imparting to the system of incremental units of energy, such as by means of a mainspring, in the case of a typical clock, for example.

While the hairspring-controlled constant speed system is perfectly adequate for many occasions, it is known to be less than perfect for certain uses, in which the timing mechanism is subjected to extreme conditions. By way of example only, one common use of balance wheel-hairspring constant speed mechanisms is in chronometric governors of the general type described and claimed in the A. W. Haydon Patent No. 2,523,298, issued September 26, 1950, and assigned to the owner of the instant invention. In chronometric governors of of this type, a D.C. motor is governed to run at an accurately controlled, constant speed by means of a balance wheel-hairspring constant speed system, and units of this type frequently are employed in timing devices of various types used in military and other aircraft, for example.

In a typical use of a balance wheel-hairspring constant speed system in an aircraft timing device, for example, or in practically any other type of moving vehicle, the hairspring may be subjected from time to time to substantial forces of acceleration. Such forces of acceleration cause the convolutions of the hairspring to distend and the hairspring to assume a condition of eccentricity. Obviously, this undesirably affects the timing accuracy of the unit.

The undesirable effects of acceleration forces (as well as extreme conditions of temperature, etc.) on timing hairsprings have been known for many years, and many attempts have been made to devise a suitable constant speed system which is operable in any orientation and yet avoids the use of a hairspring or equivalent element, which is affected undesirably by acceleration forces in particular. One of the popular proposals for accomplishing this has been to substitute some form of magnetic means for the usual hairspring, relying upon the variation in magnetic forces with changes in distance to obtain approximations of the displacement-restoring force relationships of the hairspring. However, insofar as the present application is aware, none of the proposals to this end made in the past have been satisfactory, due to inability to achieve reliable timing characteristics and/or inability to embody the concept into a practical form of device.

In accordance with the present invention, a novel form of magnetic timing system is provided which is not only extremely simple and practical in its typical embodiment, but which enables the desirable, simple harmonic characteristics of the typical hairspring to be closely approximated. The simple device of the invention incorporates fixed magnetic means cooperating with movable magnetic means carried by a balance wheel shaft and so related that simple harmonic relationships are closely approximated during oscillations of the shaft. In certain forms of the invention, the magnetic means may be used in conjunction with a typical inertia member, such as a balance wheel. In other forms of the invention, the movable magnetic means may have incorporated therein the desirable inertia characteristics, so that the magnetic means itself functions as both the inertia member and the "spring" of the constant speed system.

As one of the specific features of the invention, a novel magnetic constant speed system is provided, in which the stable condition or position of the movable magnetic member is the position in which the smallest magnetic forces are applied thereto, at least in terms of effective rotating torque. Stated in another way, the principal active magnetic forces in the system are essentially repellent, rather than attractive, so that the stable position of the movable magnetic member is determined essentially by the repellent action of a fixed north pole, for example, upon a movable north pole, rather than upon a movable south pole.

Another specific aspect of the invention resides in the provision of a magnetically actuated constant speed system constituting, in essence, a balance wheel and "spring," in which the total arc of rotation of the balance wheel (or equivalent inertia means) throughout a complete oscillating cycle, consisting of its full amplitude of rotary movement in one direction followed by a return movement in the opposite direction to its initial position, is very substantial, and advantageously is in the order of 500° to 540° of arc. In this respect, reliable timing accuracy is difficult, if not impossible, of achievement, as a practical matter, where the oscillating arc of the inertia member is too small. This factor alone may be responsible for the practical failure of many prior art proposals for using magnetic means in substitution for a conventional hairspring, since typical prior proposals of which the present applicant is aware seek to rely upon a relatively small arc of oscillation.

A further specific, advantageous feature of the invention resides in the provision of a novel, magnetically actuated constant speed system of the type and having the characteristics mentioned above which, in respect of its magnetic "spring" elements, comprises fixed magnetic means in the form of an annulus, for example, magnetized to have its north and south poles in generally diametrically opposed relation, and movable magnetic means substantially in the form of a disc or cylinder, for example, likewise having its magnetized poles at generally diametrically opposed points. Moreover, the above-mentioned, desirable and advantageous considerations of substantial oscillating arc and approximately harmonic torque-displacement relationships are realized, in accordance with the invention, in an extremely simplified manner by disposing the principal magnetic axes of the fixed and movable magnetic members at an angle to the axis of the balance wheel shaft, in a manner such as to minimize and render substantially ineffective undersirable attractive magnetic force components, notwithstanding the substantial oscillating arc of the movable magnetic member.

For a better understanding of the above and other novel and advantageous features of the invention, reference should be made to the following detailed description and to the accompanying drawing, in which:

FIG. 3 is a fragmentary, longitudinal plan view of the mechanism of FIG. 1, partly in section;

FIG. 4 is an enlarged, fragmentary, cross-sectional view illustrating in further detail one advantageous form of the magnetic constant speed system of the invention;

FIG. 5 is a perspective view of a second advantageous form of magnetic constant speed system according to the invention;

FIGS. 6 and 7 are fragmentary views in longitudinal cross-section and top plan of a third advantageous form of magnetic constant speed system according to the invention; and FIG. 8 is a graphic representation of a theoretically ideal torque-displacement relationship for a magnetic constant speed system incorporating the principles of the invention.

Figure 1:
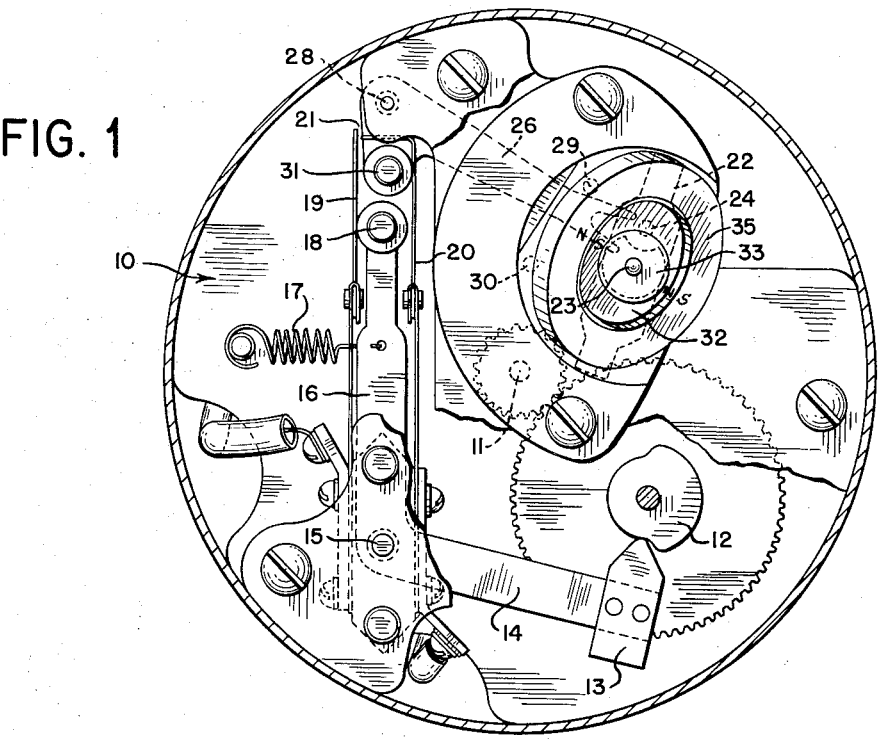
FIG. 1 is an end elevational view of an advantageous form of chronometric governor mechanism incorporating the improved magnetic constant speed system of the invention.
Figure 2:
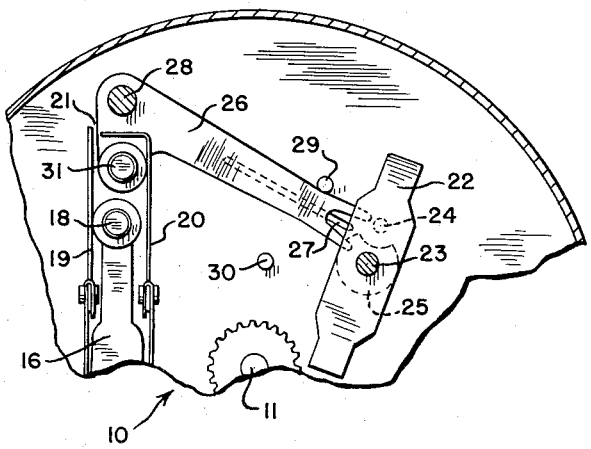
FIG. 2 is a fragmentary, cross-sectional view of the mechanism of FIG. 1, as taken generally on line 2—2 of FIG. 3, for example.

Referring now to the drawing, and initially to FIGS. 1–3 thereof, the reference numeral 10 designates generally an advantageous form of chronometric governor device such as described and claimed in the before-mentioned A. W. Haydon Patent No. 2,523,298. Briefly, such a chronometric governor comprises a D.C. electric motor (not specifically shown) the rotor shaft of which is indicated at 11. The design of the motor, in relation to its intended power supply, is such that the motor tends to travel or rotate at a speed greater than desired under normal loads. A cam 12 driven by gears from the rotor shaft acts upon a cam follower 13 to rock a cam lever 14, which is mounted at 15 for limited pivotal movement. An upper arm portion 16 of the cam lever is acted upon by a spring 17, tending to urge the lever counterclockwise, and the extreme upper end portion of the lever carries a projecting arm 18.

The power supply circuitry for the motor includes a pair of resilient blades 19, 20, lying on opposite sides of the lever arm 18, which normally make contact at 21 to complete the circuit. Thus, when the blades are in contact, power is applied to the motor until the blades subsequently are separated. The resilience of the blades 18, 20 is such that outward displacement of one of the blades, as is caused alternately with each blade upon oscillation of the cam lever 14, will not effect separation of the blade contact 21.

Operating in conjunction with the motor-oscillated switch blades 19, 20 is a constant speed system, which typically includes a balance wheel and hairspring but, in accordance with the present invention, includes a novel magnetically actuated constant speed system to be described below. The constant speed system includes inertia providing means which, in the illustrated instance, comprises a balanced bar 22 (FIG. 2). The inertia member 22 is fixed on a balance wheel shaft 23 journalled to accommodate rotary oscillations of the inertia member, as will be described.

Conventionally, the inertia member 22 carries an impulse pin 24 and notched locking discs 25. The impulse pin 24 is positioned to engage the forked end of a pallet lever 26 pivoted at 28 for limited movement between a pair of spaced banking pins 29, 30. A pin 27 cooperates with the notched disc 25 to lock the lever in its banked positions. The pallet lever also carries at its free end an arm 31 which lies between the switch blades 19, 20.

In the condition of the mechanism shown in FIG. 2, the impulse member 22 has completed a clockwise oscillation and has driven the pallet lever 26 against the upper banking pin 29, which may be magnetic in nature or may be associated with magnetic means tending to retain the pallet lever 26 in its banked position. When the inertia member 22 begins its counterclockwise oscillation, the impulse pin 24 engages the forked end of the pallet lever, as the inertia member gathers speed and momentum. The pallet lever 26 thus is dislodged from its banked position and moved to its other operative position banked against the pin 30. During the shifting of the pallet lever 26 from one banked position to another, an increment of energy is applied to the inertia member 22 through the pallet lever. In a typical clock mechanism, for example, this is accomplished by means of the main spring and escapement wheel system. In the instant mechanism, as is described more completely in the beforementioned A. W. Haydon Patent No. 2,523,298, the pallet lever is acted upon by one or the other of the resilient switch blades 19, 20 so that, during each half cycle of oscillation, a precisely measured increment of energy is imparted to the constant speed system, to make up for all friction losses in the system and maintain the oscillating elements in continuous operation.

As described more completely in the beforementioned A. W. Haydon patent, oscillation of the pallet lever 16 takes place at constant frequency, determined by the characteristics of the constant speed system, while oscillations of the cam lever 14 and its arm 18 take place at instants determined by the rotation of the motor and cam 12. Thus, in the condition of the apparatus illustrated in FIG. 1, the cam lever has just oscillated in a counterclockwise direction, displacing the blade 19 to the left. The blade 20, being restrained by the pallet lever arm 31, is unable to follow the blade 19. Accordingly, the contact 21 opens, at an instant determined by the travel of the motor. Shortly thereafter, and at an instant determined by the operation of the constant speed system, the pallet lever 26 pivots clockwise, allowing the contact 21 to close and closing the power circuit to the motor. The arrangement, as more fully described in the before-mentioned Haydon patent, is such that, during each half cycle of operation, the contact 21 is opened at an instant determined by the travel of the motor and closed by an instant determined by the operation of the constant speed system. Thus, if the motor load is particularly light and/or the supply voltage is high, both in relation to the operative ranges contemplated, the interval between contact opening and contact closing will constitute a relatively substantial portion of the operating cycle. On the other hand, where the load is great and/or operating voltage is low, the tendency for the motor to overspeed will be less and the interval between opening and closing of the contact, during each half cycle, will be a relatively small portion of the half cycle. In all events, as long as the applied loads and operating voltages are within the contemplated ranges, which may be relatively wide, the average operating speed of the motor is controlled with extreme accuracy by the constant speed system.

The above described chronometric governor mechanism is a typical and advantageous, although not limiting, environment for the novel constant speed system of the invention, particularly as such governors are incorporated frequently in timing devices for military aircraft and the like, where extreme temperature conditions and unusual acceleration forces may be encountered regularly.

In the specific form of the invention shown in FIGS. 1–4, the new constant speed system comprises a member 32 formed of magnetic material, such as Alnico VI or Ferroxdure and being substantially in the form of a circular disc. The magnetic disc is fixed to the balance wheel shaft 23 by means such as a bushing 33, which is secured to the shaft and has an end surface 34 to which the disc 32 is secured. And, as one of the specific aspects of the invention, the magnetic disc 32 is mounted at a substantial angle to the axis of the balance wheel shaft 23, substantially as illustrated in FIG. 4.

The magnetic polarization of the disc 32 is such, in accordance with the invention, that the principal magnetic poles of the disc are located at diametrically opposed areas of the disc, the imaginary magnetic axis between the poles lying in the plane of the disc and intersecting the axis of the balance wheel shaft 23 at a substantial angle.

Cooperating with the movable magnetic disc 32 is a fixed magnetic member 35, which advantageously is in the form of an annulus formed of magnetic material similar to that of the disc 32. The magnetic annulus 35 is mounted on the frame of the environmental apparatus (i.e., the governor 10) by means of a bracket 36 which disposes the annulus 35 at an angle to the balance wheel shaft 23. Advantageously, this angle is the same as the angle at which the magnetic disc 32 is disposed.

As indicated in FIG. 4, the magnetic annulus 35 is polarized such that its principal north and south poles lie in diametrically opposed areas, with its imaginary principal magnetic axis lying in the plane of the annulus and intersecting the axis of the balance shaft 23.

As one of the important specific features of the invention, the fixed and movable magnetic members 35, 32 are so arranged that, in one rotary position of the element 32, where the poles of the respective elements most closely approach each other, the coacting poles are in repelling relation. Thus, in the specific form of FIG. 4, the upper poles of each element are polarized as north poles, while the lower poles of the elements are polarized as south poles. In the specific device of FIG. 4, the orientation of the elements 32, 35 advantageously is such that, when the principal magnetic axes of the respective magnetic elements are parallel, they are also substantially coincident and the magnetic elements are substantially concentric. In this position, the movable magnetic element will be in an unstable dead-center position, with the repelling north and south pole pairs exerting relatively strong forces but no effective torque. The slightest rotary displacement of the movable magnetic element 32 will cause torque to be exerted by the repellent force of the inner acting magnetic poles, causing further rotation of the movable magnetic element 32 in the direction of initial displacement. The stable dead-center condition or position of the movable element 32 is illustrated in FIG. 4, where the inter-acting like pole pairs are at maximum separation.

One of the important, advantageous aspects of the described arrangement resides in the fact that the stable condition of the elements is that position in which the principal like pole pairs are at maximum separation. Accordingly, displacement of the magnetic element 32 from its stable position causes the repelling poles to be moved closer together, exerting a progressively stronger repelling force. Further, it can be demonstrated mathematically that the principal active forces, that is the torque applied to the balance wheel shaft by the interaction of the like pole pairs, is a function of the angle of displacement from the stabilized position, according to the following simplified formula:

$$T = \left( F \sin \frac{A}{2} \right) (\sin A)$$

where $T$ = torque
$F$ = magnetic repelling force
$A$ = angle separating like poles Plotting of the torque-versus-displacement curve according to the above formula illustrates that the principal magnetic forces involved result in an effective torque which closely approximates a linear relationship, from zero angle of displacement by to 125 to 135 degrees of rotational displacement from the stable position. Absolute linearity is, of course, the theoretically ideal condition, as this results in pure harmonic movements of the balance wheel shaft. However, the principal magnetic forces at play in the system of the invention result in such a close approximation of the linear torque-displacement relationship, within angles of displacement up to about 125 degrees from stable position, as to enable highly satisfactory timing results to be achieved. In this respect, it will be observed that an operative displacement angle of 135 degrees from stable position accommodates a total arc of oscillation, per cycle, of 540 degrees, so that the relationship of the inertia member 22 to the magnetic "spring" can be such as to accommodate an amplitude of oscillation of this order.

It should be understood, of course, that some magnetic interaction will occur between the dissimilar poles of the respective movable and fixed magnetic elements, and the effective components of torque arising from this interaction tend undesirably to affect the linear torque-displacement relationship sought for. However, it will be noted further that the particular, advantageous form of the invention illustrated in FIG. 4, for example, results in effective minimization of such interaction by disposing the respective magnetic elements at a substantial angle to the axis of rotation of the balance wheel shaft 23. Thus, in the stable condition of the elements, as shown in FIG. 4, the unlike poles of the magnetic elements are in positions of closest proximity and therefore exert the greatest attractive forces. At the same time, however, there is established a substantial displacement of the poles in the direction of the rotating axis of the shaft 23, so that the forces applied become progressively less effective to produce torque as the dissimilar poles move into closer proximity. Thus, it will be apparent that the effective influence of the interaction between dissimilar poles, in the form of the invention illustrated in FIG. 4, is a function of the angle at which the magnetic axes of the elements 32, 35 are disposed with respect to the rotating axis of the shaft 23. The smaller the angle, the less the influence from the dissimilar poles.

It will be noted that the effective minimizing of the attractive influence of dissimilar poles is of substantial benefit in accommodating a cyclic arc of oscillation on the order of 500 to 540 degrees, first by enabling the torque-displacement relationship to approximate linearity and second by eliminating "over-banking" or other disturbing cyclic influences. Desirably, the respective pairs of like poles are enabled to behave substantially as if the opposite poles, located diametrically opposite, were omitted.

In the particular form of the invention illustrated in FIGS. 1–4, the respective magnetic elements 32, 35 may be substantially circular in form. More advantageously, however, the elements may be as shown in FIG. 5, wherein the magnetic disc 32a is of elliptical form and has a circular projection in the direction of the axis of the balance wheel shaft 23. Likewise, the fixed magnetic element 35a is provided with a central opening 35b which is elliptical in form and circular in its projection along the axis of the shaft 23. When the elements are thus proportioned, the magnetic interaction will more closely achieve the theoretical results sought for.

In either of the forms of the invention illustrated in FIGS. 4 and 5, the magnetic elements 32, 32a mounted on the balance wheel shaft 23 usually will be of relatively light weight and low rotating inertia and furthermore will be characterized by a certain degree of dynamic imbalance. Accordingly, it may be desirable to utilize a movable magnetic element 32c in the form of a cylinder of magnetic material (such as one of the well known ceramic, magnetic materials), which is polarized along a particular plane so that, in magnetic effect, it behaves the same as the elliptical magnetic element 32a of FIG. 5. However, as will be readily understood, the element 32c will be dynamically balanced and may, in certain cases, have substantial rotating inertia. Accordingly, it may be appropriate, in certain cases, to omit the separate inertia element 22 and utilize the inherent inertia of the cylindrical magnetic member to provide the desired timing characteristics in conjunction with the magnetic "spring" action of the elements 35a, 32c.

In any of its various specific, illustrated forms, the timing system of the invention represents a substantial advance over known proposals to substitute magnetic combinations for the hairspring of a conventional constant speed system. The substantial advantages of the arrangement of the invention arise from its substantial approximation of linear torque-displacement characteristics and its ability to approximate such characteristics over an amplitude of 500 to 540 degrees of rotation per complete cycle.

The novel and advantageous arrangement of the invention achieves substantial linearity of torque-displacement characteristics over the desired, substantial operating range of amplitude by utilizing magnetic forces which are principally repellent in nature. This, in turn, is accommodated, in the specific, illustrated forms of the invention, in a simplified and highly expedient manner by utilizing planar or effectively planar magnetic elements, whose principal magnetic axes are disposed at a substantial angle to the axis of rotation of the balance wheel shaft.

It should be understood, however, that the specific forms of the invention herein illustrated and described are intended to be representative only, as certain changes may be made therein without departing from the clear teachings of the disclosure. Accordingly, reference should be made to the following appended claims in determining the full scope of the invention.

I claim:

1. In a timing mechanism, a reciprocating inertia member, a shaft mounting said inertia member for rotary reciprocating movement about an axis, movable magnetic means mounted on said shaft and having its principal magnetic poles in a plane lying at an acute angle to said axis, and fixed magnetic means having its principal poles in a plane lying at an angle to said axis and cooperating with the principal poles of said movable magnetic means, to urge said movable magnetic means toward a stable position.

2. The timing mechanism of claim 1, in which the principal poles of said fixed and movable magnetic means lie substantially at the same angle to said axis.

3. The timing mechanism of claim 2, in which said principal poles lie at an angle of about 45° or less to said axis.

4. The timing mechanism of claim 2, in which the principal poles of said fixed and movable magnetic means are so oriented as to cause said magnetic means to tend to repel when the principal magnetic axes thereof lie substantially in a single plane.

5. The timing mechanism of claim 1, in which said inertia member is in the form of a dynamically balanced member formed at least in part of magnetizable material, and said movable magnetic means comprises magnetized portions of said magnetizable material.

6. The timing mechanism of claim 1, in which said moving magnetic means comprises a disc of magnetizable material, said disc lying at an angle to said axis and being of a shape such as to have a generally circular projection of area along said axis.

7. In a timing mechanism, the combination of a shaft journalled for rotation throughout a substantial arc, a movable magnetic member mounted on said shaft and having an effective pole at one side thereof, a fixed magnetic member mounted adjacent said shaft and movable magnetic member, said fixed magnetic member having an effective pole located for substantial magnetic interaction with the effective pole of said movable magnetic means and being of like polarity, whereby said magnetic members are in substantial repelling relation when said effective poles are in closest proximity.

8. The timing mechanism of claim 7, in which means are provided for periodically imparting to said shaft measured increments of rotational energy, and the effective, magnetic forces tending to produce rotation of said movable magnetic means are such, in relation to said increments of energy and the rotational inertia of the system, as to maintain an arc of rotation of at least about 500° of arc per complete cycle of oscillation.

9. The timing mechanism of claim 7, in which said fixed and magnetic members are subject to both attractive and repellent magnetic interaction by magnetic poles of opposite polarity on the respective members, and the dissimilar poles of the respective members are so oriented and arranged as to render attractive magnetic interaction between said members relatively ineffective, in relation to repellent magnetic interaction, to produce torque.

References Cited in the file of this patent

UNITED STATES PATENTS

| | | |
|---|---|---|
| 1,981,110 | Kochendarfer | Nov. 20, 1934 |
| 2,061,047 | Schweitzer | Nov. 17, 1936 |
| 2,523,298 | Haydon | Sept. 26, 1950 |

FOREIGN PATENTS

| | | |
|---|---|---|
| 685,684 | Great Britain | Jan. 7, 1951 |
| 1,106,842 | France | July 27, 1955 |